(12) United States Patent
Copty et al.

(10) Patent No.: US 11,308,210 B2
(45) Date of Patent: Apr. 19, 2022

(54) AUTOMATIC MALWARE SIGNATURE GENERATION FOR THREAT DETECTION SYSTEMS

(71) Applicant: International Business Machines Corporation, Armonk, NY (US)

(72) Inventors: Fady Copty, Nazereth (IL); Matan Danos, Haifa (IL); Orit Edelstein, Haifa (IL); Dov Murik, Haifa (IL); Benjamin Zeltser, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 16/253,237

(22) Filed: Jan. 22, 2019

(65) Prior Publication Data

US 2020/0233960 A1 Jul. 23, 2020

(51) Int. Cl.
| | |
|---|---|
| *G06F 21/56* | (2013.01) |
| *G06F 21/55* | (2013.01) |
| *G06N 5/04* | (2006.01) |
| *G06N 20/00* | (2019.01) |

(52) U.S. Cl.
CPC .......... *G06F 21/566* (2013.01); *G06F 21/554* (2013.01); *G06N 5/045* (2013.01); *G06N 20/00* (2019.01); *G06F 2221/034* (2013.01)

(58) Field of Classification Search
CPC ..... G06F 21/566; G06F 21/554; G06N 20/00; G06N 5/045
See application file for complete search history.

(56) References Cited

U.S. PATENT DOCUMENTS

| 9,762,593 | B1 | 9/2017 | Kennedy et al. | |
|---|---|---|---|---|
| 2016/0036844 | A1* | 2/2016 | Kopp | G06N 20/00 726/1 |
| 2016/0205122 | A1* | 7/2016 | Bassett | G06F 21/577 726/23 |

(Continued)

OTHER PUBLICATIONS

Eli (Omid) David et al. DeepSign: Deep Learning for Automatic Malware Signature Generation and Classification. International Joint Conference on Neural Networks (IJCNN), pp. 1-8,Killarney, Ireland, Jul. 2015.

*Primary Examiner* — Nelson S. Giddins
*Assistant Examiner* — Shu Chun Gao
(74) *Attorney, Agent, or Firm* — Dan Swirsky

(57) ABSTRACT

Deriving malware signatures by training a binary decision tree using known malware and benign software samples, each tree node representing a different software feature set and having one descending edge representing samples that are characterized by the node's software feature set and another descending edge representing samples that are not characterized thusly, selecting multiple continuous descending paths for multiple subsets of nodes, each path traversing a selected one of the edges descending from each of the nodes in its corresponding subset, deriving, based on the nodes and edges in any of the paths, a malware-associated software feature signature where the malware samples represented by leaves that directly or indirectly descend from an end of the continuous descending path meets a minimum percentage of the total number of samples represented by the leaves, and providing the malware signatures for use by a computer-based security tool configured to identify malware.

20 Claims, 6 Drawing Sheets

(56) References Cited

U.S. PATENT DOCUMENTS

2016/0381042 A1  12/2016 Zhang
2017/0154182 A1   6/2017 Ferrara et al.
2018/0204126 A1*  7/2018 Galle ................... G06N 20/00

* cited by examiner

US 11,308,210 B2

AUTOMATIC MALWARE SIGNATURE GENERATION FOR THREAT DETECTION SYSTEMS

BACKGROUND

Modern computer security tools that detect malware often employ predefined "signatures" that characterize malware. These signatures typically include static or dynamic features of executable computer software, where software is identified as malware if it includes the features indicated by a malware signature. Static features characterize software independent of its execution, such as whether a hash of an executable software file results in a predefined value or whether the software is encrypted. Dynamic features characterize software based on its execution, such as whether the software makes specific system function calls or in a specific sequence. Known techniques for generating malware signatures typically employ heuristic approaches that often leave valid malware signatures undiscovered.

SUMMARY

In one aspect of the invention a method is provided for protecting computers against malware, the method including training a binary decision tree using a set of samples of executable computer software, where each of the samples are classified as either malware or non-malware prior to training the binary decision tree, where the binary decision tree includes a root node, a plurality of paths descending from the root node and having one or more edges, a plurality of intermediate nodes along any of the paths, and a plurality of leaves terminating any of the paths, where each of the nodes represents a different software feature set of one or more software features, where each of the nodes includes one edge descending therefrom representing those of the samples that are characterized by the software feature set represented by the node, and another edge descending therefrom representing those of the samples that are not characterized by the software feature set represented by the node, and where each of the leaves represents those of the samples that follow a single one of the paths from the root node to the leaf via any of the edges, selecting within the binary decision tree a continuous descending path that traverses a selected one of the edges descending from each of the nodes in a subset including one or more of the nodes, deriving, based on the nodes in the subset and the selected descending edges, a malware-associated software feature signature responsive to determining that a count of the samples classified as malware and represented by leaves that directly or indirectly descend from an end of the continuous descending path meets a predefined minimum percentage of the total number of samples represented by leaves that directly or indirectly descend from the end of the continuous descending path, and providing the malware-associated software feature signature for use by a computer-based security tool configured to identify malware on a computer using the malware-associated software feature signature and perform a computer-based security action responsive to identifying malware.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1A:
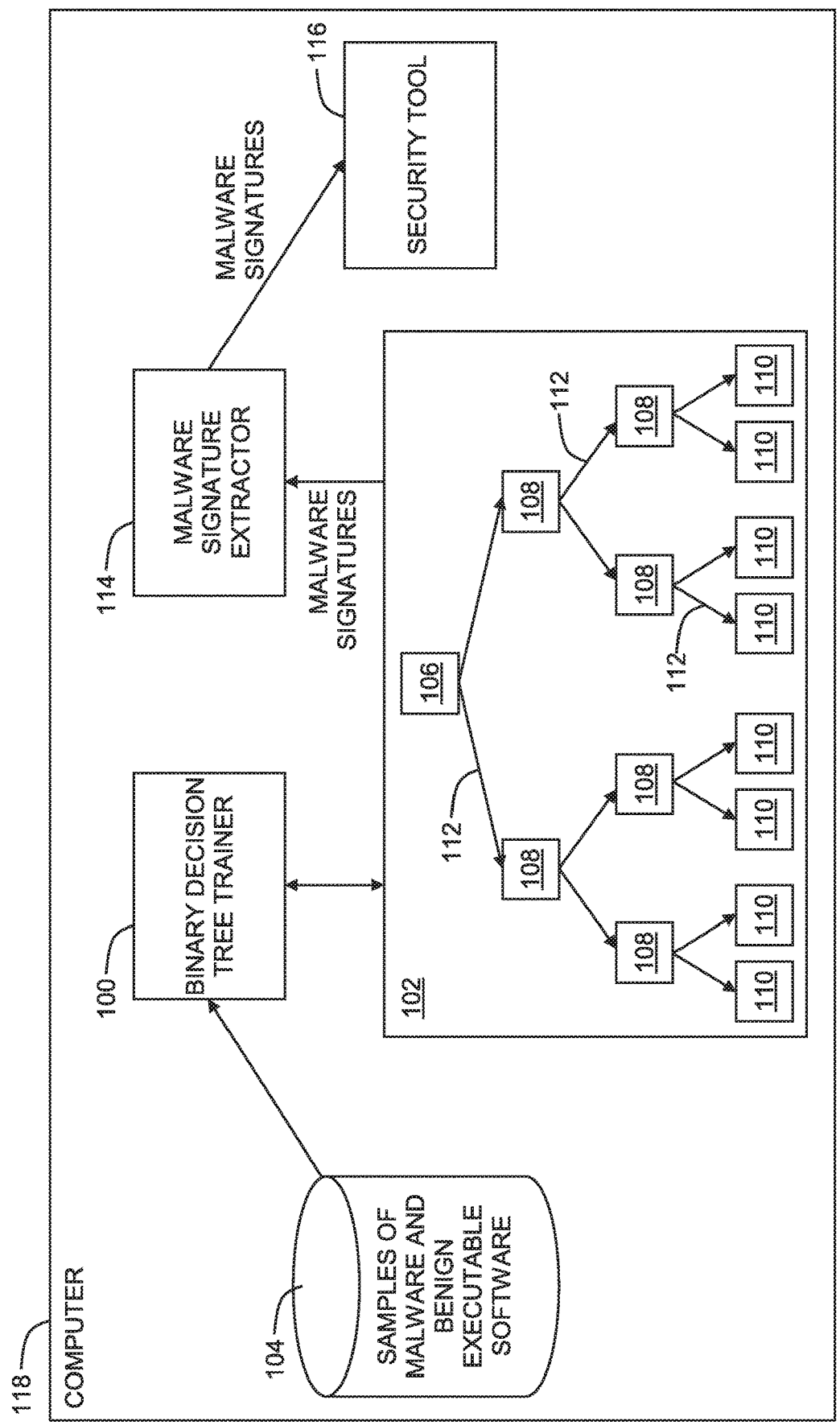
FIG. 1A is a simplified conceptual illustration of a system for protecting computers against malware, constructed and operative in accordance with an embodiment of the invention.

Reference is now made to FIG. 1A, which is a simplified conceptual illustration of a system for protecting computers against malware, constructed and operative in accordance with an embodiment of the invention. In FIG. 1A a binary decision tree trainer 100 is configured to train, in accordance with conventional techniques, a binary decision tree 102 using a set of samples 104 of executable computer software. Prior to binary decision tree trainer 100 training binary decision tree 102, each of the samples in samples 104 are classified as either malware or non-malware in accordance with conventional techniques.

Binary decision tree 102 includes a root node 106, any number of intermediate nodes 108, and any number of leaves 110. Each of the nodes 106 and 108 represents a different software feature set of one or more predefined software features that characterize executable computer software, preferably where the software features particularly characterize executable computer software that are known to be malware, or where the software features are otherwise characterized as suspicious. Each of the software features in each software feature set may be a static feature that does not characterize the execution of computer software, such as the number of various types of sections in an executable file, entropy of each section in an executable file, whether or not there is a discrepancy between the checksum as recorded in the executable file header and the checksum of the executable file itself, or a dynamic feature that necessarily characterizes the execution of computer software, such as function calls or other actions performed by computer software during execution. Each of the nodes 106 and 108 include two descending edges 112 representing a binary decision, where one of the descending edges represents those of samples 104 that are characterized by the software feature set represented by the node, while the other descending edge represents those of samples 104 that are not characterized by the software feature set represented by the node. Binary decision tree trainer 100 trains binary decision tree 102 by determining which of the software feature sets characterizes each of the samples 104. Where a given node 106 or 108 represents a given software feature set that includes one or more static features, binary decision tree trainer 100 determines that the given software feature set characterizes a given one of samples 104 if the given sample exhibits the static features in the given software feature set. Likewise, where the given software feature set includes one or more dynamic features, binary decision tree trainer 100 determines that the given software feature set characterizes a given one of samples 104 if the given sample performs the actions indicated by the dynamic features in the given software feature set. If the given software feature set includes multiple dynamic features that must be performed in a specified order, binary decision tree trainer 100 determines that the given software feature set characterizes a given one of samples 104 if the given sample performs the actions in the specified order.

One or more continuous descending paths may be seen within binary decision tree 102, where each continuous descending path descends from root node 106 or any of intermediate nodes 108 and terminates at another one of intermediate nodes 108 or at one of leaves 110, and may include one or more additional intermediate nodes 108. Each continuous descending path also includes one of the edges 112 descending from each of the nodes 106 or 108 that are included in the path, and thus each continuous descending path includes an equal number of nodes 106 or 108 and descending edges 112, connected in an unbroken series of alternating nodes and edges. Each of leaves 110 terminates a different continuous descending path from root node 106 and represents those of samples 104 that are either characterized by or nor characterized by the software feature sets represented by the nodes 106 and 108 included in its path depending on the descending edges 112 included in its path.

Figure 1B:
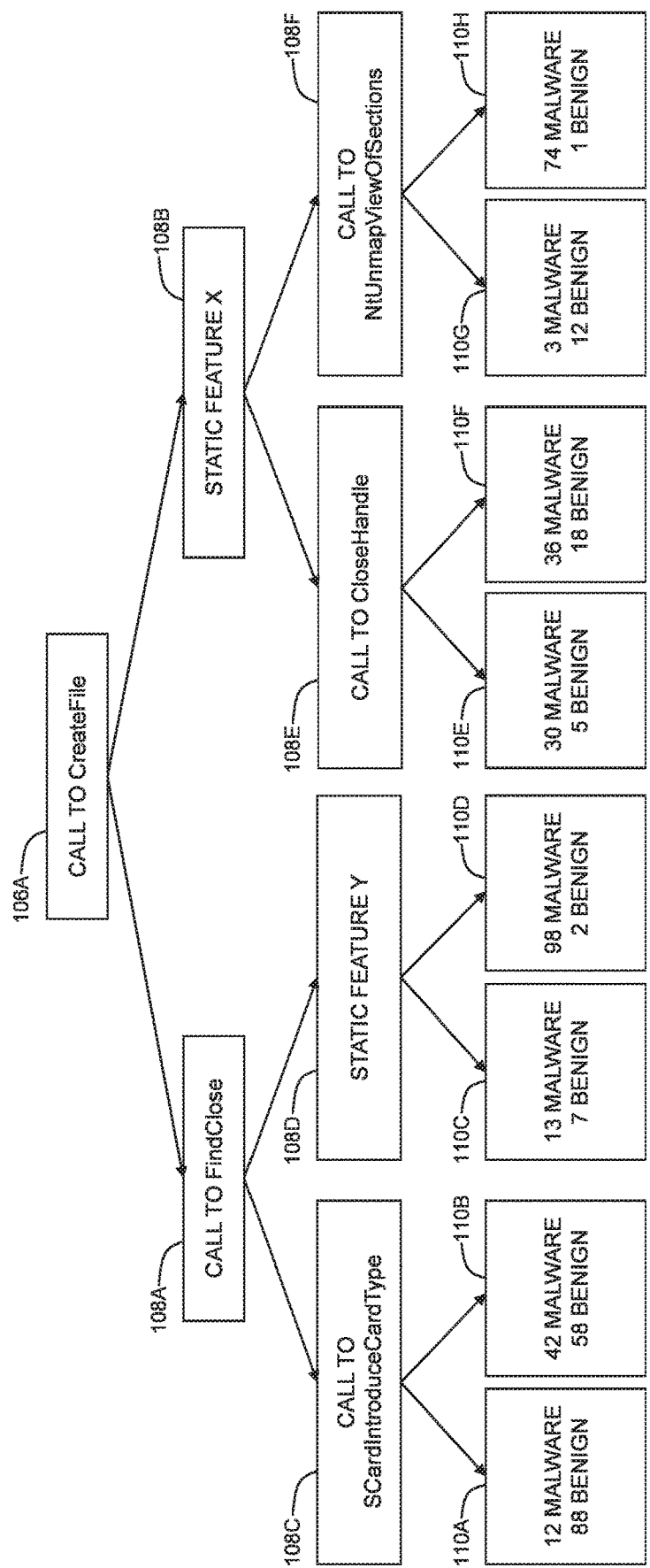
FIG. 1B is a simplified illustration of an exemplary binary decision tree, constructed and operative in accordance with an embodiment of the invention.

An exemplary representation of binary decision tree 102 is shown in FIG. 1B, where a root node 106A and intermediate nodes 108A-108F are shown, each node having two descending edges, where the right edge descending from each node indicates those of samples 104 that are characterized by the software feature set represented by the node, while the left descending edge indicates those of samples 104 that are not characterized by the software feature set. Leaves 110A-110H are shown, where each leaf represents those samples that follow a single path from root node 106A.

Returning to FIG. 1A, a malware signature extractor 114 is configured to select within binary decision tree 102 a continuous descending path that traverses a selected one of the edges 112 descending from each of the nodes in a subset including one or more selected ones of nodes 106 and 108. In one embodiment, the selected edges 112 descending from each of the nodes in the subset represent those of samples 104 that are characterized by the software feature set represented by the node. Malware signature extractor 114 is configured to derive, based on the selected nodes in the subset and the selected descending edges 112 in the selected continuous descending path, a malware-associated software feature signature where a count of the samples 104 classified as malware and represented by leaves 110 that directly or indirectly descend from the end of the continuous descending path meets a predefined minimum percentage of the total number of samples 104 represented by leaves 110 that directly or indirectly descend from the end of the continuous descending path. This percentage represents the true positive rate (TPR) at which the derived malware signature is expected to characterize malware as malware, whereas the remaining percentage of the samples 104 classified as benign and represented by leaves 110 that directly or indirectly descend from the end of the continuous descending path represents the false positive rate (FPR) at which the derived malware signature is expected to characterize benign software as malware. Thus, in the example shown in FIG. 1B, the selection of a continuous descending path that includes intermediate node 108A, intermediate node 108D, and their right descending edges, includes those of samples 104 that are characterized by a call to FindClose (intermediate node 108A) and by exhibiting static feature Y (intermediate node 108D). These samples are represented by leaf 110D, being the only leaf that descends directly or indirectly the end of the selected continuous descending path. Leaf 110D represents 100 of samples 104, 98 of which were previously classified as malware and 2 of which were previously classified as benign. If the predefined minimum percentage is set at 98%, then a malware-associated software feature signature may be derived from the selected continuous descending path and used to classify as malware any executable software that that are characterized by a call to FindClose and by exhibiting static feature Y.

Returning again to FIG. 1A, malware signature extractor 114 is configured to derive multiple malware-associated software feature signatures in the manner described above corresponding to different subsets of selected nodes 106 and 108. Malware signature extractor 114 preferably provides the malware-associated software feature signatures for use by a computer-based security tool 116 configured, in accordance with conventional techniques, to identify malware on a computer using the malware-associated software feature signatures and perform a computer-based security action responsive to identifying malware.

Binary decision tree trainer 100 is preferably configured to train multiple binary decision trees 102 from which malware signature extractor 114 derives multiple malware-associated software feature signatures in the manner described above. In one embodiment, binary decision tree trainer 100 uses different random seeds to train different binary decision trees 102 in accordance with conventional techniques. In another embodiment, binary decision tree trainer 100 generates a random forest of multiple binary decision trees 102 in accordance with conventional techniques. In another embodiment, binary decision tree trainer 100 generates one binary decision tree 102 and then removes one or more nodes 106 or 108 from the binary decision tree 102, such as root node 106 and/or one or more of nodes 106 and 108 selected at random, whereupon binary decision tree trainer 100 retrains binary decision tree 102 to generate a different binary decision tree 102, which process may be repeated multiple times to generate different sets of associated software feature signatures. In another embodiment, nodes 106 and 108 and edges 112 are arranged to provide binary decision tree 102 with any predefined depth, thereby controlling the maximum path length for generating software feature signatures.

Any of the elements shown in FIG. 1 are preferably implemented by one or more computers in computer hardware and/or in computer software embodied in a non-transitory, computer-readable medium in accordance with conventional techniques, such as where any of the elements shown in FIG. 1 are hosted by a computer 118.

Figure 2A:
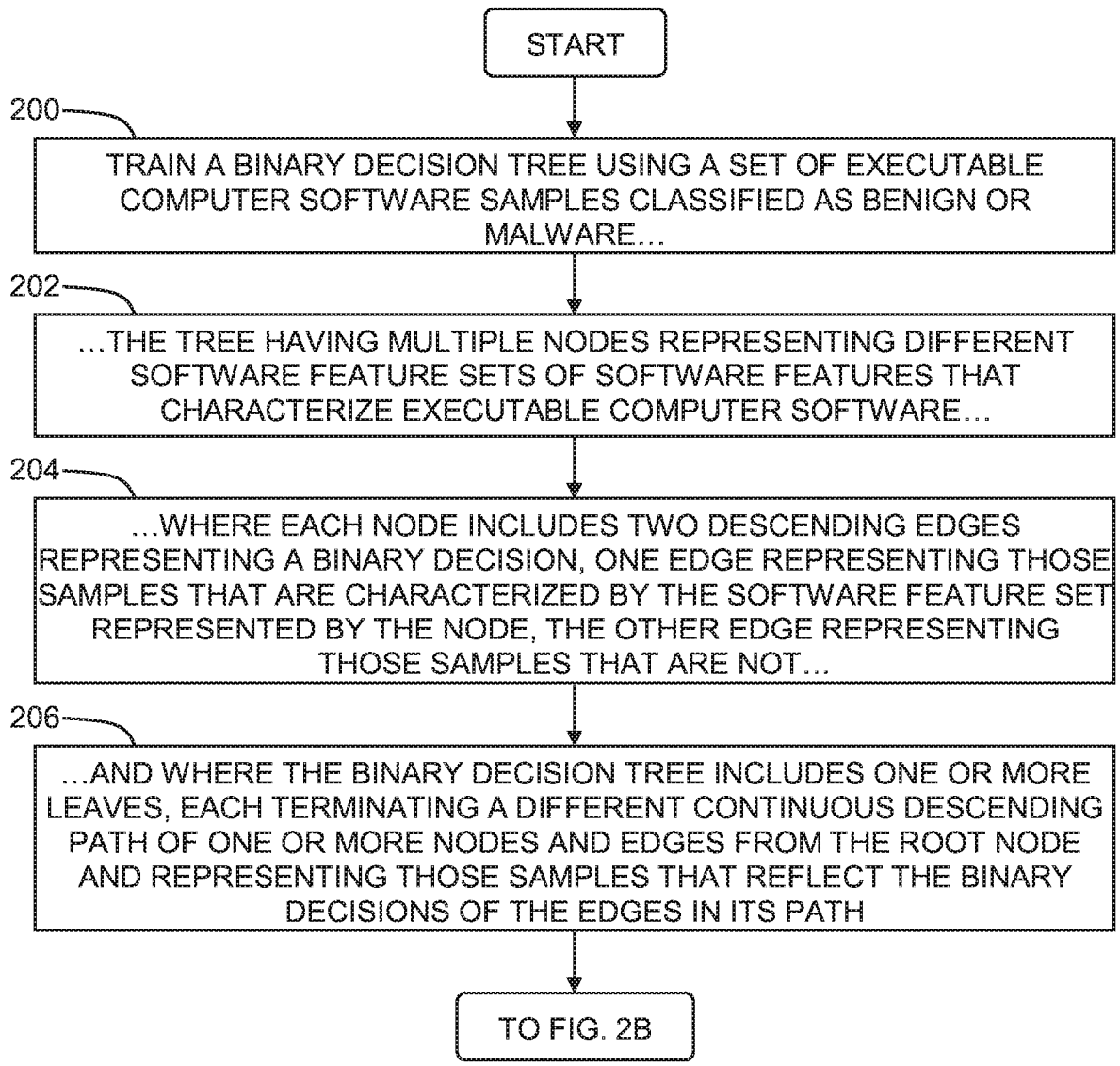
FIGS. 2A and 2B, taken together, is a simplified flowchart illustration of an exemplary method of operation of the system of FIG. 1, operative in accordance with an embodiment of the invention.
Figure 2B:
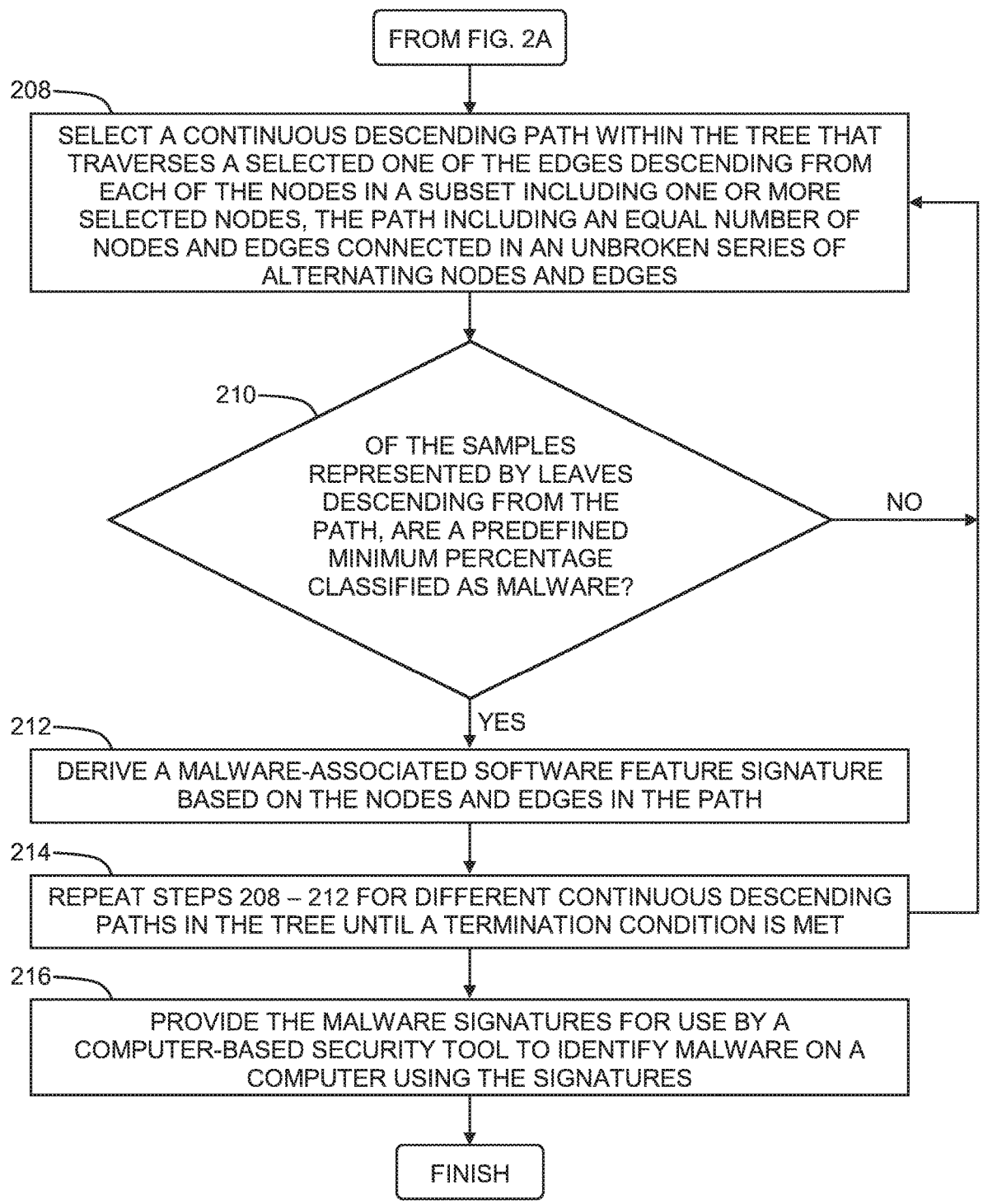

Reference is now made to FIGS. 2A and 2B, which, taken together, is a simplified flowchart illustration of an exemplary method of operation of the system of FIG. 1, operative in accordance with an embodiment of the invention. In the method of FIGS. 2A and 2B, a binary decision tree is trained using a set of samples of executable computer software classified as benign or malware (step 200), the tree having multiple nodes representing different software feature sets of one or more predefined static or dynamic software features that characterize executable computer software (step 202), where each node includes two descending edges representing a binary decision, one edge representing those samples that are characterized by the software feature set represented by the node, the other edge representing those samples that are not (step 204), and where the binary decision tree includes one or more leaves, each terminating a different continuous descending path of one or more nodes and edges from the root node and representing those samples that reflect the binary decisions of the edges in its path (step 206). A continuous descending path is selected within the tree that traverses a selected one of the edges descending from each of the nodes in a subset including one or more selected nodes, the path including an equal number of nodes and edges connected in an unbroken series of alternating nodes and edges (step 208). If a count of the samples classified as malware and represented by leaves that directly or indirectly descend from the end of the continuous descending path meets a predefined minimum percentage of the total number of samples represented by the leaves (step 210), a malware-associated software feature signature is derived based on the nodes and edges in the path (step 212). Steps 208-212 are preferably repeated for different continuous descending paths in the tree until a termination condition is met, such as until all possible continuous descending paths in the tree have been evaluated in this manner, after a predefined period of time has elapsed, or after a predefined number of paths have been evaluated (step 214). The malware signatures are preferably provided for use by a computer-based security tool to identify malware on a computer using the signatures (step 216).

The method of FIGS. 2A and 2B is preferably performed to train and derive malware signatures from multiple binary decision trees, such as by using different random seeds to train different binary decision trees, by generating a random forest of multiple binary decision trees, or by removing one or more nodes from a binary decision tree and retraining the tree to generate a different binary decision tree, which process may be repeated multiple times.

Figure 2C:
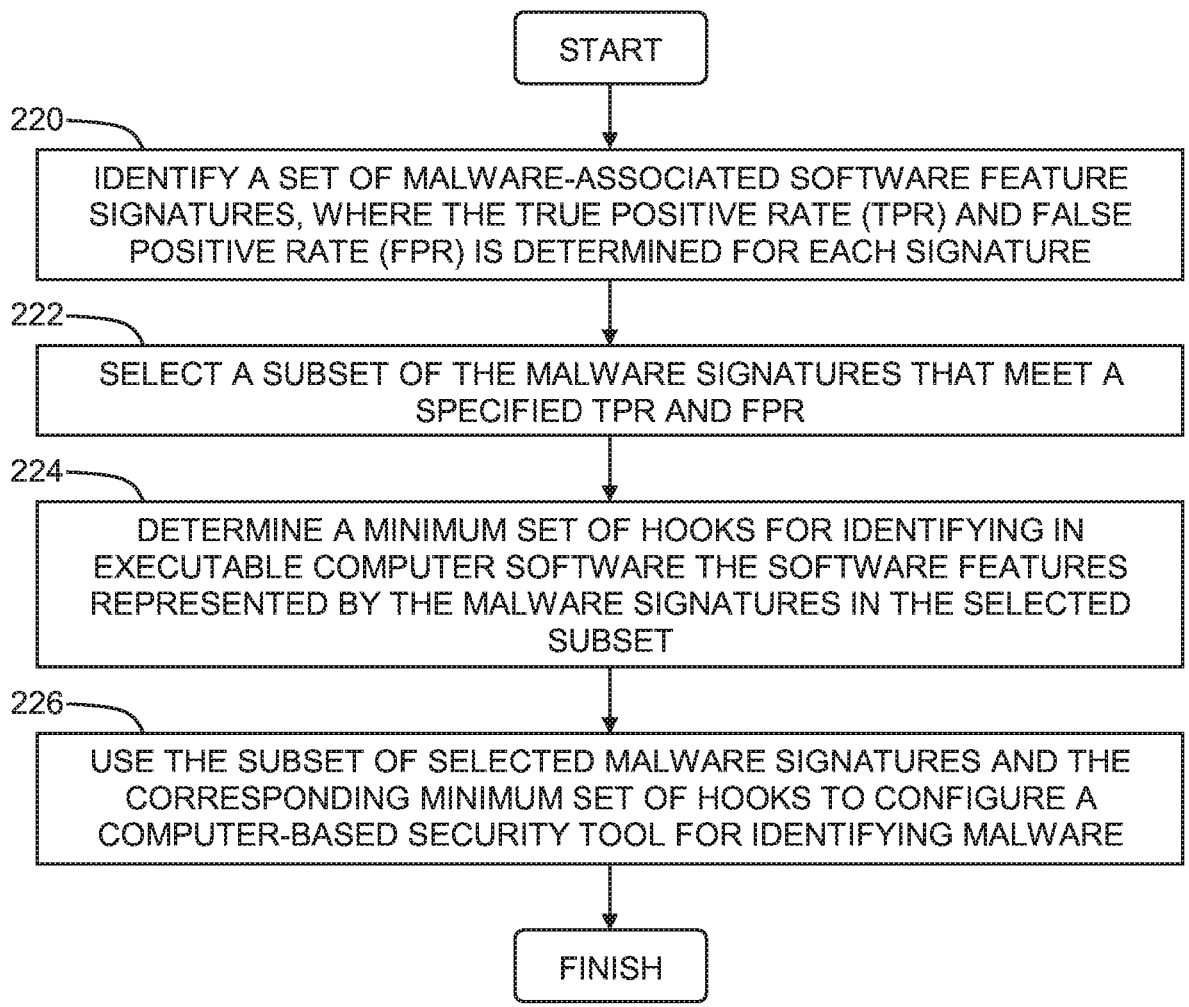
FIG. 2C, is a simplified flowchart illustration of a method for determining a minimal set of hooks needed to configure a computer-based security tool for identifying malware, operative in accordance with an embodiment of the invention.

Reference is now made to FIG. 2C, which is a simplified flowchart illustration of a method for determining a minimal set of hooks needed to configure a computer-based security tool for identifying malware, operative in accordance with an embodiment of the invention. In the method of FIG. 2C, a set of malware-associated software feature signatures is identified, where the true positive rate (TPR) and false positive rate (FPR) is determined for each signature, such as in accordance with the method described hereinabove in FIGS. 2A and 2B (step 220). Given a specified TPR and FPR, such as may be required by a computer-based security tool for identifying malware, a subset is selected of the malware signatures that meet the specified TPR and FPR (step 222). A minimum set of "hooks" is determined in accordance with conventional techniques for identifying in executable computer software the software features represented by the malware signatures in the selected subset (step 224), where the term "hook" refers to code that intercepts actions performed by executable computer software, such as function calls, events or messages, in connection with dynamic features of the software, or code that identifies static features of the software. The minimum set of hooks is preferably determined such that each of the software features represented by the malware signatures in the selected subset is identifiable by a computer-based security tool that implements the minimum set of hooks, and such that omitting any hook from the minimum set of hooks would prevent the computer-based security tool from identifying at least one of the software features represented by the malware signatures in the selected subset. The subset of selected malware signatures and the corresponding minimum set of hooks are used to configure the computer-based security tool to meet the specified TPR and FPR (step 226). Steps 220-224 may be implemented by malware signature extractor 114 of FIG. 1A, while step 226 may be implemented by malware signature extractor 114 or computer-based security tool 116 of FIG. 1A.

Figure 3:
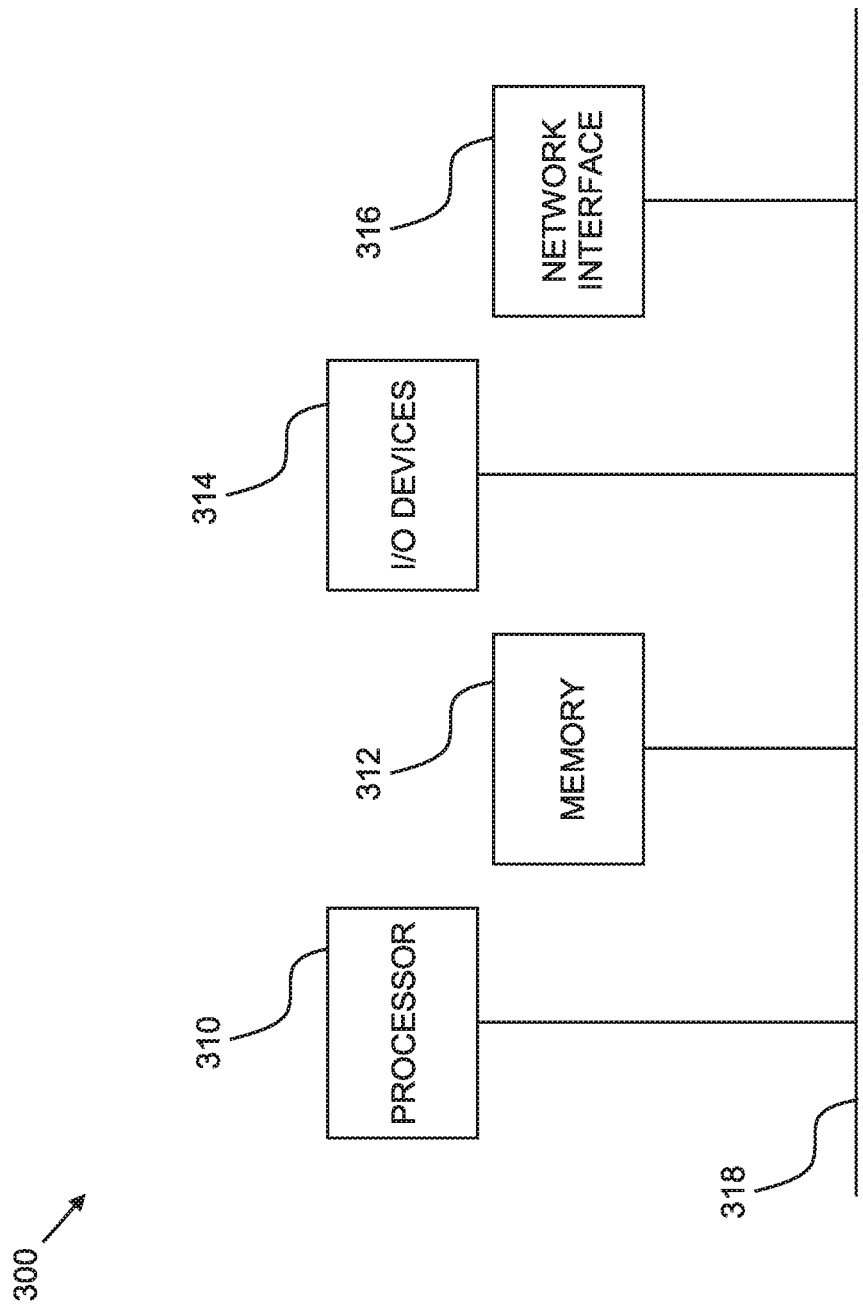
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1 and 2A-2C) may be implemented, according to an embodiment of the invention. As shown, the invention may be implemented in accordance with a processor 310, a memory 312, I/O devices 314, and a network interface 316, coupled via a computer bus 318 or alternate connection arrangement.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for protecting computers against malware, the method comprising:
    training a binary decision tree using a set of samples of executable computer software,
        wherein each of the samples are classified as either malware or non-malware prior to training the binary decision tree,
        wherein the binary decision tree includes a root node, a plurality of paths descending from the root node and having one or more edges, a plurality of intermediate nodes along any of the paths, and a plurality of leaves terminating any of the paths,
        wherein each of the nodes represents a different software feature set of one or more software features,
        wherein each of the nodes includes
            one edge descending therefrom representing those of the samples that are characterized by the software feature set represented by the node, and
            another edge descending therefrom representing those of the samples that are not characterized by the software feature set represented by the node, and
        wherein each of the leaves represents those of the samples that follow a single one of the paths from the root node to the leaf via any of the edges;

selecting within the binary decision tree a continuous descending path that traverses a selected one of the edges descending from each of the nodes in a subset including one or more of the nodes;

deriving, based on the nodes in the subset and the selected descending edges, a malware-associated software feature signature responsive to determining that a count of the samples classified as malware and represented by leaves that directly or indirectly descend from an end of the continuous descending path meets a predefined minimum percentage of the total number of samples represented by leaves that directly or indirectly descend from the end of the continuous descending path; and providing the malware-associated software feature signature for use by a computer-based security tool configured to identify malware on a computer using the malware-associated software feature signature and perform a computer-based security action responsive to identifying malware.

2. The method according to claim 1 wherein the selecting comprises selecting wherein the selected edges descending from each of the nodes in the subset represent those of the samples that are characterized by the software feature set represented by the node.

3. The method according to claim 1 wherein the training comprises training wherein each of the software features is a static software feature or a dynamic software feature.

4. The method according to claim 1 and further comprising determining which of the software feature sets characterizes each of the samples.

5. The method according to claim 4 wherein the determining comprises determining that a given one of the software feature sets characterizes a given one of the samples if the given sample performs one or more actions indicated by the given software feature set.

6. The method according to claim 4 wherein the determining comprises determining wherein any of the software feature sets includes an ordered plurality of software features, and wherein a given one of the software feature sets characterizes a given one of the samples if the given sample performs actions indicated by the ordered plurality of software features and in an order indicated by the ordered plurality of software features.

7. The method according to claim 1 and further comprising performing the selecting and deriving multiple times for different subsets of the nodes to derive multiple malware-associated software feature signatures, wherein the providing comprises providing the multiple signatures for use by the computer-based security tool.

8. A system for protecting computers against malware, the system comprising:
a processor, and a non-transitory computer-readable storage medium having computer-readable program code embodied thereon, wherein the program code is executable by said processor to:
train a binary decision tree using a set of samples of executable computer software,
wherein each of the samples are classified as either malware or non-malware prior to training the binary decision tree,
wherein the binary decision tree includes a root node, a plurality of paths descending from the root node and having one or more edges, a plurality of intermediate nodes along any of the paths, and a plurality of leaves terminating any of the paths,
wherein each of the nodes represents a different software feature set of one or more software features,
wherein each of the nodes includes
one edge descending therefrom representing those of the samples that are characterized by the software feature set represented by the node, and
another edge descending therefrom representing those of the samples that are not characterized by the software feature set represented by the node, and
wherein each of the leaves represents those of the samples that follow a single one of the paths from the root node to the leaf via any of the edges;
select within the binary decision tree a continuous descending path that traverses a selected one of the edges descending from each of the nodes in a subset including one or more of the nodes;
derive, based on the nodes in the subset and the selected descending edges, a malware-associated software feature signature responsive to determining that a count of the samples classified as malware and represented by leaves that directly or indirectly descend from an end of the continuous descending path meets a predefined minimum percentage of the total number of samples represented by leaves that directly or indirectly descend from the end of the continuous descending path; and
provide the malware-associated software feature signature for use by a computer-based security tool configured to identify malware on a computer using the malware-associated software feature signature and perform a computer-based security action responsive to identifying malware.

9. The system according to claim 8 wherein the selected edges descending from each of the nodes in the subset represent those of the samples that are characterized by the software feature set represented by the node.

10. The system according to claim 8 wherein each of the software features is a static software feature or a dynamic software feature.

11. The system according to claim 8 wherein the training of the binary decision tree further comprises determining which of the software feature sets characterizes each of the samples.

12. The system according to claim 11 wherein the training of the binary decision tree further comprises determining that a given one of the software feature sets characterizes a given one of the samples if the given sample performs one or more actions indicated by the given software feature set.

13. The system according to claim 11 wherein the training of the binary decision tree trainer further comprises determining wherein any of the software feature sets includes an ordered plurality of software features, and wherein a given one of the software feature sets characterizes a given one of the samples if the given sample performs actions indicated by the ordered plurality of software features and in an order indicated by the ordered plurality of software features.

14. The system according to claim 8 wherein the deriving comprises deriving multiple malware-associated software feature signatures corresponding to different subsets of the nodes, and the providing comprises providing the multiple signatures for use by the computer-based security tool.

15. A computer program product for protecting computers against malware, the computer program product comprising:
a non-transitory, computer-readable storage medium; and
computer-readable program code embodied in the storage medium, wherein the computer-readable program code is configured to
train a binary decision tree using a set of samples of executable computer software, wherein each of the samples are classified as either malware or non-malware prior to training the binary decision tree, wherein the binary decision tree includes a root node, a plurality of paths descending from the root node and having one or more edges, a plurality of intermediate nodes along any of the paths, and a plurality of leaves terminating any of the paths, wherein each of the nodes represents a different software feature set of one or more software features, wherein each of the nodes includes
- one edge descending therefrom representing those of the samples that are characterized by the software feature set represented by the node, and
- another edge descending therefrom representing those of the samples that are not characterized by the software feature set represented by the node, and wherein each of the leaves represents those of the samples that follow a single one of the paths from the root node to the leaf via any of the edges, select within the binary decision tree a continuous descending path that traverses a selected one of the edges descending from each of the nodes in a subset including one or more of the nodes, derive, based on the nodes in the subset and the selected descending edges, a malware-associated software feature signature responsive to determining that a count of the samples classified as malware and represented by leaves that directly or indirectly descend from an end of the continuous descending path meets a predefined minimum percentage of the total number of samples represented by leaves that directly or indirectly descend from the end of the continuous descending path, and provide the malware-associated software feature signature for use by a computer-based security tool configured to identify malware on a computer using the malware-associated software feature signature and perform a computer-based security action responsive to identifying malware.

16. The computer program product according to claim 15 wherein the selected edges descending from each of the nodes in the subset represent those of the samples that are characterized by the software feature set represented by the node.

17. The computer program product according to claim 15 wherein each of the software features is a static software feature or a dynamic software feature.

18. The computer program product according to claim 15 wherein the computer-readable program code is configured to determine which of the software feature sets characterizes each of the samples.

19. The computer program product according to claim 18 wherein a given one of the software feature sets characterizes a given one of the samples if the given sample performs one or more actions indicated by the given software feature set.

20. The computer program product according to claim 18 wherein any of the software feature sets includes an ordered plurality of software features, and wherein a given one of the software feature sets characterizes a given one of the samples if the given sample performs actions indicated by the ordered plurality of software features and in an order indicated by the ordered plurality of software features.

* * * * *